United States Patent
D'Angelo et al.

(10) Patent No.: US 11,567,308 B2
(45) Date of Patent: Jan. 31, 2023

(54) DEVICE AND PROCESS FOR CAPTURING MICROSCOPIC PLENOPTIC IMAGES WITH TURBULENCE ATTENUATION

(71) Applicant: ISTITUTO NAZIONALE DI FISICA NUCLEARE, Frascati (IT)

(72) Inventors: Milena D'Angelo, Bari (IT); Francesco Vincenzo Pepe, Bari (IT); Alessio Scagliola, Bari (IT); Francesco Maria Di Lena, Casamassima (IT); Augusto Garuccio, Bari (IT)

(73) Assignee: ISTITUTO NAZIONALE DI FISICA NUCLEARE, Frascati (IT)

( * ) Notice: Subject to any disclaimer, the term of this patent is extended or adjusted under 35 U.S.C. 154(b) by 89 days.

(21) Appl. No.: 17/265,469

(22) PCT Filed: Jul. 25, 2019

(86) PCT No.: PCT/IB2019/056370
§ 371 (c)(1),
(2) Date: Feb. 2, 2021

(87) PCT Pub. No.: WO2020/026093
PCT Pub. Date: Feb. 6, 2020

(65) Prior Publication Data
US 2021/0318532 A1    Oct. 14, 2021

(30) Foreign Application Priority Data

Aug. 3, 2018   (IT) .................. 102018000007857

(51) Int. Cl.
*G02B 21/36* (2006.01)
*H04N 5/225* (2006.01)
*G02B 27/10* (2006.01)

(52) U.S. Cl.
CPC ....... *G02B 21/361* (2013.01); *G02B 27/1006* (2013.01); *H04N 5/22541* (2018.08)

(58) Field of Classification Search
CPC .............. G02B 21/361; G02B 27/1006; G02B 27/0075; H04N 5/22541
See application file for complete search history.

(56) References Cited

U.S. PATENT DOCUMENTS

2018/0203217 A1   7/2018 Knebel et al.
2019/0271592 A1*  9/2019 Gray ................. G02B 21/16

FOREIGN PATENT DOCUMENTS

CN          104344793          2/2015

OTHER PUBLICATIONS

Scarcelli et al., "Can Two-Photon Correlation of Chaotic Light Be Considered as Correlation of Intensity Fluctuations?" Physical Review Letters, 2006, 4 pages.
(Continued)

*Primary Examiner* — Nam D Pham
(74) *Attorney, Agent, or Firm* — Nixon & Vanderhye (57) ABSTRACT

A system for acquiring microscopic plenoptic images with attenuation of turbulence by a microscope includes, in combination: a sample, the image of which should be obtained, which is able to be treated as a source of chaotic light, whose emission has an intensity profile F(ρs), with ρs planar coordinate on the sample plane; a beam separator; two sensors or detectors, configured to perform the spatial/directional and directional/spatial detection, respectively, in which the planar coordinate on the detector planes is respectively indicated with ρa and ρb; an objective lens, having focal length fO and pupil function PO(ρO), with ρO planar coordinate on the plane of the lens; a second lens, having focal length fT and pupil function PT(ρT), with ρT planar coordinate on the plane of the lens; wherein the second lens (Continued)

is arranged in the optical path (a/b) of the beam transmitted/reflected by the beam separator.

20 Claims, 4 Drawing Sheets

(56) References Cited

OTHER PUBLICATIONS

D'Angelo et al., "Correlation Plenoptic Imaging," Physical Review Letters, vol. 116, 2016, 6 pages.
Levoy et al., "Light Field Microscopy," Association for Computing Machinery, Inc., Trans. Graph. 25, 2006, pp. 924-934.
Georgiev et al., "Focused plenoptic camera and rendering," Journal of Electronic Imaging, vol. 19, No. 2, Apr.-Jun. 2010, 11 pages.
International Search Report for PCT/IB2019/056370 dated Dec. 5, 2019, 3 pages.
Written Opinion of the ISA for PCT/IB2019/056370 dated Dec. 5, 2019, 6 pages.
Pepe et al., "Exploring plenoptic properties of correlation imaging with chaotic light", arXiv.org, Cornell University Library, Oct. 6, 2017, XP080826623, 9 pages.

\* cited by examiner

PRIOR ART

DEVICE AND PROCESS FOR CAPTURING MICROSCOPIC PLENOPTIC IMAGES WITH TURBULENCE ATTENUATION

CROSS-REFERENCE TO RELATED APPLICATIONS

This application is the U.S. national phase of International Application No. PCT/IB2019/056370 filed Jul. 25, 2019 which designated the U.S. and claims priority to IT 102018000007857 filed Aug. 3, 2018, the entire contents of each of which are hereby incorporated by reference.

FIELD OF THE INVENTION

The present invention relates to a technique for the plenoptic acquisition of images in the field of microscopy, stereoscopy and, in general, of three-dimensional image techniques.

In particular, the plenoptic acquisition procedure according to the present invention is called "Correlation Plenoptic Imaging" (CPI), i.e. it refers to a plenoptic image acquisition based on the space-time correlation of the luminous intensities recorded by the sensors arranged to acquire the spatial and angular measurement of the image.

PRIOR ART

The term "plenoptic acquisition of images" refers to a particular optical method according to which it is possible to acquire both the position and the direction of propagation of light in a given scene. In this way, it is possible to obtain a spatial measurement and an angular measurement which allow reconstructing the acquired image three-dimensionally.

In fact, in an image processing step following its acquisition, it is possible, for example, to change the position of the focal plane of the image or to extend the depth of field of the image or to reconstruct a three-dimensional image.

The currently known conventional image acquisition technique allows choosing the magnification, the focal plane position and the depth of field by means of suitable lenses positioned upstream with respect to the image acquisition sensor.

The traditional image acquisition technique, however, has the limitation of offering a two-dimensional representation of an originally three-dimensional scene. The three-dimensional representation of images is useful in many technical applications, such as those concerning the modeling of components to be used in virtual simulation environments, or those concerning the representation of objects for prototyping, design, production, marketing, inspection and maintenance, or those generally concerning an improved representation of an object of a three-dimensional scene in order to ensure an improved experience for the user and a more realistic result.

Moreover, the traditional image acquisition technique does not allow changing the focal plane position or the depth of field at a time subsequent to the image acquisition. In the photographic field, it is very common to have the need to focus on a particular plane or to choose the depth of field of the image in a moment after the acquisition.

With reference to the field of microscopy, it is worth noting that large resolutions correspond to small depths of field. Since it is not possible to change the focal plane after the acquisition, if one wants to deeply characterize the sample under examination, it is necessary to perform a large number of scans with different focusing planes. In this regard, it should be noted that exposing the sample to radiation for a long time, especially if it is biological samples, may damage it or, in the case of in vivo observations, cause damage to the patient.

Therefore, the traditional microscopic image acquisition technique has several drawbacks that the plenoptic acquisition technique has the purpose of solving.

The currently known plenoptic image acquisition technique allows obtaining images with different focal planes in different positions of the three-dimensional space of the scene. This feature is made possible by the acquisition of the spatial and angular measurement of light in the scene.

The term "spatial measurement" refers to the traditional two-dimensional image acquisition of a plane within the scene, while "angular measurement" refers to the acquisition of the information necessary to determine the direction of propagation of the beam of light from the scene to be acquired. In a processing step following the image acquisition, it is possible to combine the spatial and the angular measurements in order to reconstruct a three-dimensional image.

The currently known plenoptic image acquisition technique is based on the insertion of an array of microlenses arranged between a main lens, adapted to focus the image of the scene of interest on the array of microlenses, and a sensor, adapted to acquire the image of a given scene. The array of microlenses plays a double role. On the one hand, it behaves like an array of points capable of acquiring the spatial measurement of the scene, on the other side it reproduces a sequence of images of the main lens (one for each microlens) on the sensor, thus providing the angular size of the scene.

Unlike traditional image acquisition techniques, a plenoptic image acquisition device captures double information on the position and direction of light for each pixel of the sensor. This means that in the processing of an image, it is possible to obtain different perspectives or views of the scene, thus allowing the user to choose the scene plane in focus and the depth of field, as well as obtaining a three-dimensional reconstruction of the scene.

However, the currently known plenoptic image acquisition technique has the drawback of producing images at a lower resolution than the physical limit ("diffraction limit") determined by the diameter and focal length of the main lens. In fact, the currently known plenoptic image acquisition technique provides for the use of a single sensor for the simultaneous acquisition of the spatial and angular measurement of the scene. This feature limits the spatial resolution of the acquired image as part of the sensor's resolution capability is sacrificed to the benefit of the angular measurement. Moreover, in the currently known plenoptic image acquisition technique, the maximum spatial and angular resolution are linked by an inverse proportionality ratio, due to the use of a single sensor to obtain both spatial and angular information. Therefore, the images produced by known plenoptic image acquisition devices have the drawback of being at low resolution, i.e. they are characterized in that the resolution of the images is well below the resolution given by the diffraction limit.

A better understanding of the present invention and of the objects and advantages thereof with respect to what is currently known result from with the following detailed description and with reference to the accompanying drawings which illustrate, by way of a non-limiting example, some preferred embodiments of the invention.

As already mentioned, the plenoptic imaging devices currently on the market, including plenoptic microscopes, are based on the standard structure of imaging devices, in which the images are acquired through the measurement of the light intensity distribution on a sensor. These devices are adapted to plenoptic imaging by inserting an array of microlenses in front of the sensor. On the one hand, the image of the object is formed on the microlenses: they then act as "effective pixels", determining the limit of spatial resolution of the image, and each given microlens corresponds to a given portion of an object. On the other hand, each microlens reproduces an image of the main lens on the sensor portion behind it. Each of these images of the main lens provides information on the direction of the light propagating from the portion of the object corresponding to the microlens to the portion of the lens corresponding to the pixel of the sensor.

Figure 1:
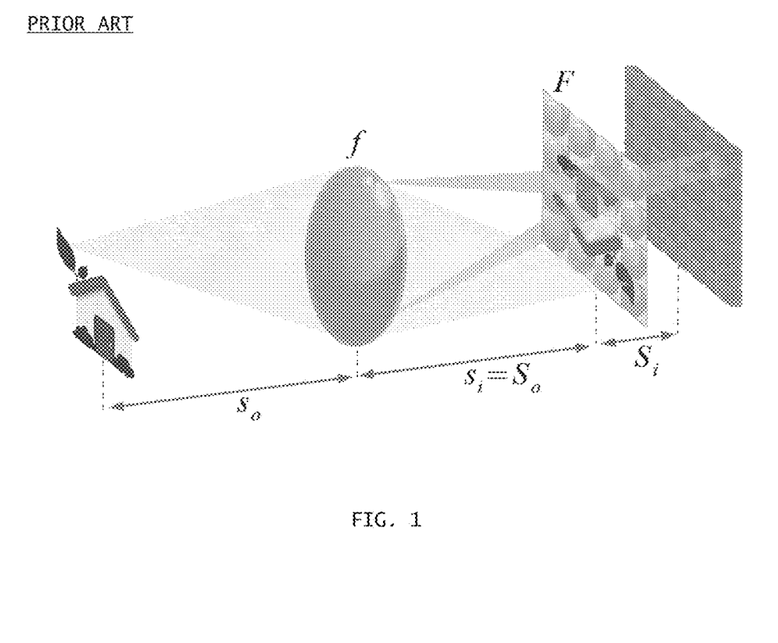
FIG. 1 shows a constructive scheme of the main components of a known plenoptic device.

As a result of this configuration, shown in FIG. 1, there are the following drawbacks:

The presence of a strong compromise between spatial resolution and directional resolution is clear, expressed by the inverse proportionality ratio Nx Nu=Ntot which binds the number of pixels per side dedicated to spatial detection (Nx) and to directional detection (Nu), with Ntot being the number of pixels per side of the sensor.

The image resolution is reduced by a factor Nu with respect to the physical limit determined by the diameter and focal length of the lens (diffraction limit); therefore, the images acquired by the plenoptic microscopes (and by plenoptic devices in general) are characterized by a resolution worse than the corresponding non-plenoptic devices.

Given the structure of the devices, the magnification of the multiple images of the main lens must be much lower than the unit, which results in a low directional resolution. Considering that the depth of field of a plenoptic device is Nu times larger than the corresponding non-plenoptic system, this structural limitation limits the maximum depth of field to be reached.

It is worth noting that plenoptic imaging devices with correlation measurements (CPI: Correlation Plenoptic Imaging) already developed by a part of the inventor group of the present invention solve the above limitations by decoupling the sensors dedicated to spatial measurement (image of the object) and to the directional measurement (image of the lens).

In fact, in such devices, once the total number of pixels per side of the sensor (Ntot) is fixed, the constraint which links spatial and directional resolution is Nx+Nu=Ntot. Furthermore, there are no limitations on the resolution of the image, thus being capable of reaching the diffraction limit. And finally, in the aforementioned devices already developed by some of the inventors, the image of the entire lens is projected onto a single sensor dedicated to this purpose. This feature allows obtaining arbitrary magnifications, even larger than the unit. Thus, in the regime in which geometric optics is valid, directional resolution (determined by Nu) can be much more precise than standard plenoptic imaging devices, and the depth of field can be much more extensive.

A first object of the present invention, with respect to the preceding CPI devices, is to provide a plenoptic device in which the object whose image is to be obtained is positioned before the beam separator.

A second object of the present invention is to provide a plenoptic device in which the light source coincides with the object itself.

It should be noted that this last object is of fundamental importance in view of the application to plenoptic microscopy. In fact, the principle of operation of old setups was based on the possibility of accurately reconstructing the direction of light in its propagation from a chaotic source through the object. Old setups cannot therefore work to obtain the plenoptic images of fluorescent or diffusive samples, which are extremely common in microscopy, in which the direction of the emitted light is tendentially unrelated to that of the incident light.

The first object, on the other hand, is relevant from the point of view of the attenuation of turbulence, that is, of the noise effects which determine a random, unpredictable and generally time-dependent variation in the amplitude and the phase of the light. In fact, if the turbulence modifies the phase and the direction of light propagation only along the common path from the object S to the beam separator BS, measuring the correlations of intensity between the two beams after the beam separator BS has the effect of partially canceling the noises due to phase turbulence along this stretch of the plenoptic device. The ability to perform imaging in the presence of turbulence is a relevant and practically unsolved problem to date, especially in the microscopic context. In particular, the images acquired with the present invention are practically insensitive to turbulence within the sample or close to its surface. This feature is not shared by old CPI setups, whose effectiveness is actually very sensitive to the presence of turbulence near the object.

Compared to the previous proposals of correlating microscopy and imaging insensitive to turbulence, the device described is the first one which combines with these features the possibility of performing plenoptic imaging, and thus refocusing objects out of focus, extending the depth of field, obtaining three-dimensional images. Furthermore, it is noted that the present device does not require either the consistency of the light emitted by the sample nor the quantum entanglement properties of the emitted photons.

Figure 2:
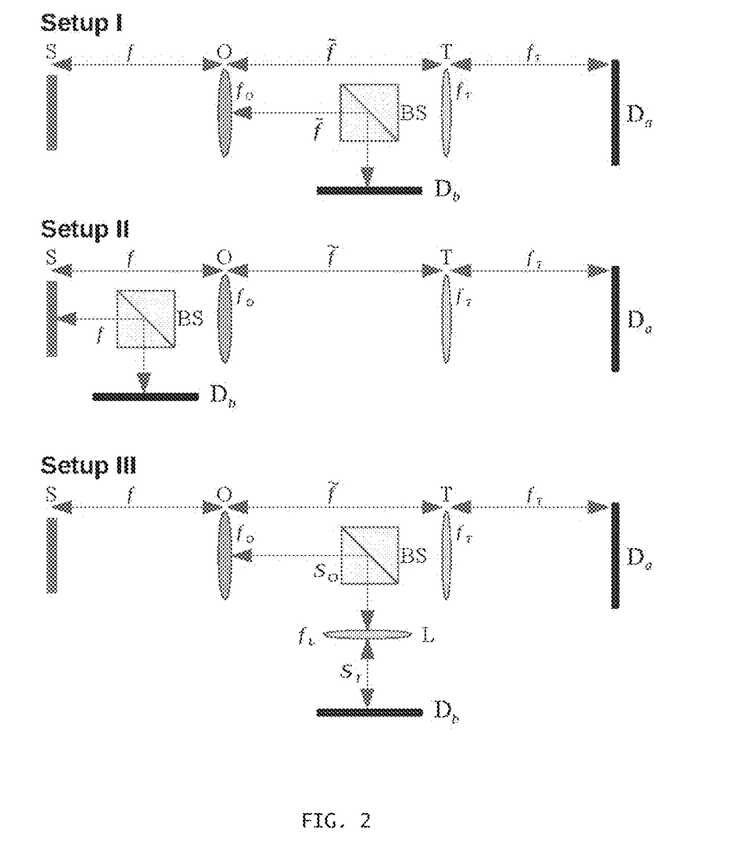
FIG. 2 schematically shows three constructive setups according to the present invention, where the three cases are all characterized by a sample 5, an objective lens O, a second lens T, a beam separator BS and two detectors $D_a$ and $D_b$ (for the arm of the transmitted beam and for that of the reflected beam, respectively) with high spatial resolution, and they differ in the position of the beam separator BS with respect to the lenses and, in the case of setup III, in the presence of a third additional lens.

With reference to FIG. 2, three different embodiments of the invention will be described below, i.e. three setups for performing plenoptic microscopy by measuring second-order intensity correlations.

The constructive schemes of these three setups, shown in FIG. 2, differ in the arrangement of the components and in the strategy of acquiring information on the direction of light. The necessary components are:

- a sample S, of which the microscopic image has to be obtained, treated as a source of chaotic light, whose emission is characterized by the intensity profile $F(\rho_s)$, with $\rho_s$ planar coordinate on the plane of the sample;
- two sensors $D_a$ and $D_b$, which perform the spatial and directional detection, respectively, for the transmitted beam and the reflected beam; as will be seen in more detail below, they may also be represented by different parts of the same sensor; the planar coordinate on the detector planes is indicated with $\rho_a$ and $\rho_b$, respectively;
- an objective lens O, characterized by focal length $f_O$ and pupil function $P_O(\rho_O)$, with $\rho_O$ planar coordinate on the plane of the lens;
- a second lens T, characterized by focal length $f_T$ and pupil function $P_T(\rho_T)$, with $\rho_T$ planar coordinate on the plane of the lens;
- a beam separator BS; if the light intensity profile does not depend on the polarization, it may also be a polarizing beam splitter;
- only in setup III: a third lens L, with focal length $f_L$.

According to the invention described, the plenoptic microscopy systems may also include additional components which, although not necessarily required by the operating principle, can help to optimize the structure and efficiency of the device. Some of these additional components are:

- a frequency filter to reduce the bandwidth of the light emitted by the object, in order to match its coherence time with the response time of the sensor;
- additional lenses and mirrors for shaping the optical path, in order to be able to use, for example, a single sensor divided into two parts as sensors $D_a$ and $D_b$;
- polarizing and/or intensity filters for absorbing part of the light in one or both of the optical paths, to prevent the saturation of the sensor.

In all cases, while the ordinary image may be obtained directly on sensor $D_a$ of the transmitted beam (provided the object is in focus, $f=f_O$), the plenoptic image, which also contains information on the direction of the light, is obtained by analyzing the correlations of intensity between the pixels of the two sensors. Specifically, the image emerges from the correlation between the intensity fluctuations $$\Gamma(\rho_a,\rho_b)=\langle \Delta I_a(\rho_a)\Delta I_b(\rho_b)\rangle, \quad (1)$$

where $\langle \ldots \rangle$ denotes an average on the statistics of the light emitted by the sample, $I_{a,b}(\square_{a,b})$ are the intensities in positions $\square_a$ and $\square_b$ on each sensor and $\Delta I_{a,b}=I_{a,b}-\langle \Delta I_{a,b}\rangle$ the fluctuations in intensity with respect to their average value $\langle I_{a,b}\rangle$. The statistical mean is practically replaced by a time average over N successive frames of duration $\tau$, acquired in a time window of duration T. Under the assumption that the light emitted has negligible traverse coherence, the correlation of intensity fluctuations is valid, apart irrelevant constant factors [3], $$\Gamma(\rho_a,\rho_b)=|\int d^2\rho_s g_a(\rho_a,\rho_s)g_b(\rho_b,\rho_s)^* \mathcal{F}(\rho_s)|^2, \quad (2)$$

with $g_a$ and $g_b$ optical transfer functions in path a and b, respectively. In the following sections, the correlation of intensity fluctuations will be calculated for each setup in FIG. 2, considering the differences in the optical transfer functions and the approximations made.

In all the setups shown in FIG. 2, the optical path a from Sample S to sensor $D_a$ of the transmitted beam is identical to the path of light in a common microscope: in the case in focus, the sample and the sensor $D_a$ are at a distance $f_O$ from, the objective lens O and $f_T$ from, the second lens T, respectively. However, to reveal the ability to refocus the proposed setups, we will consider the case where the object is at a distance f from the target, generally different from $f_O$.

In all three setups, the positioning of the sample before the beam separator BS ensures robustness with respect to the effects of turbulence in the vicinity of unlike other CPI devices, in which the object is placed after the BS, in the arm of the transmitted beam or in the arm of the reflected beam. Advantageously, in the setups according to the present invention, the effects of the turbulence present at a longitudinal distanced from the object can be neglected, provided that the transverse dimension $\delta_t$, within which the phase variations due to turbulence are practically constant, satisfies $$\delta_t \gtrsim \frac{d_t}{k\delta}, \quad (3)$$

with $k=2\pi/\lambda$ light wave number and $\delta$ size of the smallest sample detail.

Setup I

In the first setup, a beam splitter BS is placed between the objective lens O and the second lens T. The beam transmitted by the beam separator BS affects the second lens T and is focused on the sensor $D_a$, the beam reflected by the beam separator BS reaches the sensor $D_b$, which is placed at the same distance as the second lens T with respect to the beam separator BS. In other words, the optical paths from the sample to the second lens T, and from the sample to the detector $D_b$, are practically identical. This feature ensures that, when measuring the correlations between the intensities measured by sensors $D_a$ and $D_b$, a ghost image of the second lens T is formed at $D_b$ [1, 2]. Thus, the combined information of the image of the second lens T and the image of the object plane of the microscope (usually different from the plane in which the sample effectively lies) will help the reconstruction of the out of focus image of the object.

It is assumed that the aperture of the objective lens O is irrelevant, or $P_O(\rho_O)$ can be replaced with a constant in the transfer functions without significantly altering their value. This assumption is based on the fact that the resolutions are essentially fixed by the aperture $P_T$ of the second lens T by the intensity profile F of the sample. When this hypothesis is not satisfied, the finite aperture of the objective can be included in the analysis by replacing the pupil function $P_r$ of the second T lens with an effective pupil function. The correlation function (2), in this scheme, becomes $$\Gamma(\rho_a,\rho_b) = \mathcal{K} \left| \int d^2\rho_s \int d^2\rho_T \mathcal{F}(\rho_s) P_T(\rho_T) e^{ik\varphi_1(\rho_s,\rho_T,\rho_a,\rho_b)} \right|^2 \quad (4)$$

with $$\varphi_1(\rho_s,\rho_T,\rho_a,\rho_b) = \frac{1}{2\tilde{f}}\left(1-\frac{F}{\tilde{f}}\right)\rho_T^2 - \rho_T \cdot \left(\frac{\rho_a}{f_T}+\rho_s\frac{F}{\tilde{f}f}\right) + \frac{F}{\tilde{f}f}\rho_b \cdot \rho_s, \quad (5)$$

where $k=2\pi/\lambda$ is the light wave number and length F defined as $$\frac{1}{F} = \frac{1}{f} + \frac{1}{\tilde{f}} - \frac{1}{f_O}, \quad (6)$$

was introduced for convenience. In the case of focus, $(f=f_O)$ F=f the integration of the correlation function on the sensor plane $\rho_b$ provides the inconsistent image of the sample, magnified by a factor $m=f_T/f_O$, $$\sum(\rho_a) = \int d^2\rho_b \Gamma(\rho_a, \rho_b)\big|_{f=f_O} = \qquad (7)$$

$$\tilde{\mathcal{K}} \int d^2\rho_s |\mathcal{F}(\rho_s)|^2 \left| \int d^2\rho_T P_T(\rho_T) \exp\left(-\frac{ik}{f_O}\rho_T \cdot \left(\rho_s + \frac{\rho_a}{M}\right)\right)\right|^2$$

whose point-spread function is determined by the Fourier transform of the pupil function of the second lens T, as in the image reproduced directly on sensor $D_a$. Unlike the latter, however, the image obtained in correlation contains within the integral a term in the square modulus: this is irrelevant for roughly binary objects, but in the general case it can lead to variations with respect to ordinary imaging. In both cases, the resolution of the image increases as the diameter of the second lens T increases, while the natural depth of field decreases quadratically. Likewise, it is possible to show that the integration on the plane of sensor $D_a$ returns an image of the second lens T as a function of $\rho_b$, whose point-spread function is determined by the intensity profile of the sample.

The dominant contribution to equation (4) in the limit of geometric optics (large frequency and small wavelength of light) is determined by the stationary point $(\bar{\rho}_T, \bar{\rho}_S)$ of phase (5), and leads to the asymptotic approximation $$\Gamma(\rho_a, \rho_b) \sim |P_T(\rho_b)|^2 \left| \mathcal{F}\left(-\frac{\tilde{f}}{F}\frac{f}{f_T}\rho_a - \frac{f}{\tilde{f}}\left(1 - \frac{\tilde{f}}{F}\right)\rho_b\right)\right|^2 \quad (8)$$

Thus, the correlation is reduced to the product of two images, i.e. the image of sample S (second term), and the image of the second lens T (first term). Because of the structure of equation (4), these images are consistent. The position of the sample image on sensor $D_a$ depends on the coordinate p, on the other sensor $D_b$, except in the case where the microscope is in focus $(f=f_O, F=\tilde{f})$. When the image is out of focus, the integration on $D_b$ adapted to increase the signal-to-noise ratio, as in equation (7), deletes the sample image. However, the point-by-point knowledge of $\Gamma(\rho_a, \rho_b)$ allows reordering the correlation matrix, to factor the dependence on $\rho_a$ and $\rho_b$ and refocusing the image.

In the limit of geometric optics, the "refocused" correlation matrix $$\Gamma_{ref}(\rho_a, \rho_b) = \Gamma\left[\frac{F}{\tilde{f}}\frac{f_O}{f}\rho_a + \frac{f_T}{\tilde{f}}\left(1 - \frac{F}{\tilde{f}}\right)\rho_b, \rho_b\right] \sim |P_T(\rho_b)|^2 \left|\mathcal{F}\left(-\frac{\rho_a}{M}\right)\right|^2 \quad (9)$$

provides a sample image independent of $\rho_b$, as in the case in focus. Therefore, the integration on $\rho_b$ following the implementation of the refocusing algorithm (9) allows increasing the signal-to-noise ratio of the sample image, since it exploits all the light transmitted by the second lens T:

$$\sum_{ref}(\rho_a) = \int d^2\rho_b \Gamma_{ref}(\rho_a, \rho_b) \sim \left|\mathcal{F}\left(-\frac{\rho_a}{M}\right)\right|^2 \quad (10)$$

The results of equations (8)-(9) demonstrate, in the limit of geometric optics, the ability to refocus the first setup of CPI microscopy.

Setup II

In the second setup, the beam separator BS is placed between the sample S and the objective lens O. While the beam path transmitted by the beam separator BS is identical to the first setup, the beam reflected by the beam separator BS affects the reflected beam sensor $D_b$, which is positioned at the same distance from the beam separator BS with respect to the objective lens O. This ensures that, by measuring the correlations between the intensities detected by the two sensors of the transmitted beam $D_a$ and of the reflected beam $D_b$, the ghost image of the lens is reproduced by the sensor $D_b$. The image of the sample S, in focus or out of focus, is reproduced by the sensor $D_a$ either directly or by measuring correlations with each pixel of $D_b$.

Unlike the previous case, it is assumed for simplicity that the opening of the second lens T is irrelevant, that is, $P_T(\rho_T)$ is a constant function, and that the resolutions are essentially fixed by the aperture $P_O$ of the objective lens and the intensity profile of the sample. The correlation function (2) becomes $$\Gamma(\rho_a, \rho_b) = \mathcal{K}\left|\int d^2\rho_s \int d^2\rho_O \mathcal{F}(\rho_s)P_O(\rho_O) e^{ik\varphi_2(\rho_s,\rho_O,\rho_a,\rho_b)}\right|^2 \quad (11)$$

with $$\varphi_2(\rho_s, \rho_O, \rho_a, \rho_b) = \frac{1}{2}\left(\frac{1}{f} - \frac{1}{f_O}\right)\rho_O^2 - \rho_O \cdot \left(\frac{\rho_a}{f_T} + \frac{\rho_s}{f}\right) + \frac{\rho_b \cdot \rho_s}{f} \quad (12)$$

In the case of focus $(f=f_O)$, the integration of the correlation function on the sensor plane $D_b$ of the reflected beam produces the incoherent, enlarged image of $M=f_T/f_O$, of the sample $$\sum(\rho_a) = \int d^2\rho_b \Gamma(\rho_a, \rho_b)\big|_{f=f_O} = \qquad (13)$$

$$\tilde{\mathcal{K}} \int d^2\rho_s |\mathcal{F}(\rho_s)|^2 \left|\int d^2\rho_O P_O(\rho_O)\exp\left(-\frac{ik}{f_O}\rho_O \cdot \left(\rho_s + \frac{\rho_a}{M}\right)\right)\right|^2$$

whose point-spread function is determined by the Fourier transform of the pupil function of the objective lens O, as in the image reproduced directly on the sensor $D_a$. The resolution increases as the lens diameter increases, while the natural depth of field decreases quadratically. The integration of the correlation function on the sensor plane Da produces an image of the objective lens O as a function of $\rho_b$, with the point-spread function determined by the intensity profile of the sample S.

The dominant contribution to (11) in the limit of geometric optics is fixed by the stationary point $(\bar{\rho}_O, \bar{\rho}_s)$ of phase (12) and leads to the asymptotic approximation $$\Gamma(\rho_a, \rho_b) \sim |P_O(\rho_b)|^2 \left|\mathcal{F}\left(-\frac{f}{f_O}\frac{\rho_a}{M} + \left(1 - \frac{f}{f_O}\right)\rho_b\right)\right|^2 \quad (14)$$

Also in this case, the position of the sample image on $D_a$ depends on the coordinate p, on the other detector $D_b$, except in the case where the microscope is in focus $(f=f_O, F=\tilde{f})$, and the integration on $D_b$ to increase the signal-to-noise ratio may produce an out of focus image of the sample. However, the dependence on $\rho_a$ and $\rho_b$ can be factored through an appropriate choice of the first argument of the correlation matrix:

$$\Gamma_{ref}(\rho_a, \rho_b) = \Gamma\left[\frac{f_O}{f}\rho_a - \left(1 - \frac{f_O}{f}\right)M\rho_b, \rho_b\right] \sim |P_O(\rho_b)|^2 \left|\mathcal{F}\left(-\frac{\rho_a}{M}\right)\right|^2 \quad (15)$$

The integration of $\rho_b$ after performing the operation of refocusing (15) produces an image of the sample with a greater signal-to-noise ratio:

$$\sum_{ref}(\rho_a) = \int d^2\rho_b \Gamma_{ref}(\rho_a, \rho_b) \sim \left|\mathcal{F}\left(-\frac{\rho_a}{M}\right)\right|^2 \quad (16)$$

The results (14)-(15) show, in the limit of the geometric optics, the ability to refocus the second setup of CPI microscopy.

The second setup has advantages over the first one, since the directional reconstruction is based on the image of the objective, which generally defines the opening of a microscope: therefore, it is not necessary to introduce an effective pupil function, and the design of the apparatus is (at least in principle) simpler; regarding the refocusing algorithm, formula (15) depends on simpler combinations of system distances with respect to (9). On the other hand, Setup II has a significant drawback from a practical-operational point of view, due to the need to insert a beam separator BS into the generally very small space between sample S and objective O, which also implies a fine adjustment of the distance between sample S and sensor $D_b$ to obtain a focused lens ghost image.

Setup III

The Setup III in FIG. 2 remedies the drawback just discussed in Setup II: it provides an image of the objective as in Setup II, and has the beam separator BS placed between the objective O and the second lens T as in the Setup I. In this case, the image of the objective lens O is formed by a third lens L—preferably thin—with focal length $f_L$, placed in the arm of the reflected beam b, directly on sensor $D_b$, and is focused if distances $S_O$ and $S_I$ satisfy $1/S_I + 1/S_O = 1/f_L$. The focusing of the objective on the sensor $D_b$ can thus be controlled in real time by means of intensity measurements, and does not require fine adjustment of the distance between the beam separator BS and the objective O with respect to the distance between the beam separator BS and the sensor $D_b$ of the reflected beam, necessary for the correct operation of setup II.

The calculation of $\Gamma(\rho_a, \rho_b)$ passes, as in the case II, through the substitution of $\rho_b \to -\rho_b/M_L$, with $M_L = S_I/S_O$ magnification of the objective given by the third lens L, and the irrelevant multiplication by $P_O(-\rho_b/M_L)$, leading to $$\Gamma(\rho_a, \rho_b) = \quad (17)$$

$$\mathcal{K}\cdot\left|P_O\left(-\frac{\rho_b}{M_L}\right)\int d^2\rho_s \int d^2\rho_O \mathcal{F}(\rho_s)P_O(\rho_O)e^{ik\varphi_2(\rho_s,\rho_O,\rho_a,\rho_b)}\right|^2$$

with $$\varphi_3(\rho_s, \rho_O, \rho_a, \rho_b) = \frac{1}{2}\left(\frac{1}{f} - \frac{1}{f_O}\right)\rho_O^2 - \rho_O \cdot \left(\frac{\rho_a}{f_T} + \frac{\rho_s}{f}\right) + \frac{\rho_b \cdot \rho_s}{M_L f}. \quad (18)$$

The refocusing algorithm $$\Gamma_{ref}(\rho_a, \rho_b) = \quad (19)$$

$$\Gamma\left[\frac{f_O}{f}\rho_a + \left(1 - \frac{f_O}{f}\right)\frac{M}{M_L}\rho_b, \rho_b\right] \sim \left|P_O\left(-\frac{\rho_b}{M_L}\right)\right|^4 \left|\mathcal{F}\left(-\frac{\rho_a}{M}\right)\right|^2$$

and the high-SNR (Signal to Noise Ratio) refocused image $$\sum_{ref}(\rho_a) = \int d^2\rho_b \Gamma_{ref}(\rho_a, \rho_b) \sim \left|\mathcal{F}\left(-\frac{\rho_a}{M}\right)\right|^2 \quad (20)$$

follow, as in previous cases, by the approximation of geometric optics.

Resolution and Limits of the Depth of Field

The refocusing algorithms (10), (16) and (20) were obtained in the geometric optics limit. To determine the physical limits, and therefore the maximum resolution and the depth of field obtainable by refocusing, one should calculate without approximations the quantities (4), (11), (17), which incorporate the effects of finite wavelength and coherence, like diffraction and interference. In order to quantify the resolution and depth of field of the three embodiments (three Setups) described so far, we perform this calculation in a simple case, in which we want to solve two slits of width $\delta$, separated by a distance from center to center $d=2\delta$. The minimum resolved distance d is defined, according to Rayleigh's criterion, as the distance at which the visibility of the double slit image is 10%. Using this criterion, we compare the resolution of a CPI microscope, with fixed blurring $f-f_O$, with those of a standard microscope and a standard plenoptic microscope. To this end, we consider a plenoptic microscope with $N_u=3$, i.e. with 3×3=9 directional resolution cells [4, 5]; in fact, in a standard plenoptic device, the depth of field grows with $N_u$, while the resolution worsens by the same factor (compared to a standard device with the same numerical aperture), so the choice made is typically a good compromise.

Figure 3A:
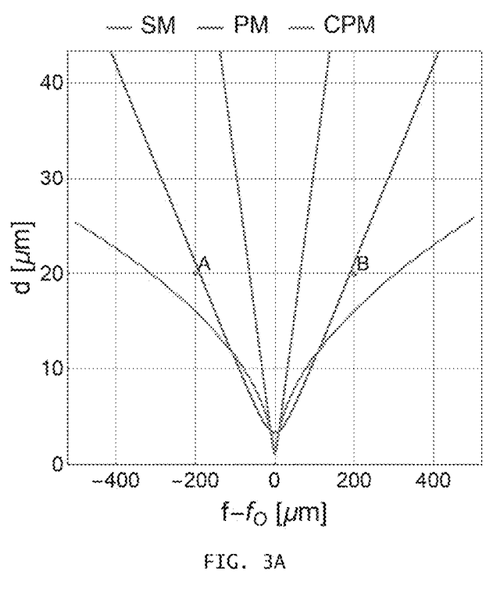
FIG. 3A is a graph comparing the resolution of a standard microscope (SI), a classic plenoptic microscope (PI) and a microscope with correlation measurements (CPI) using the configuration of Setup III, depending on the longitudinal displacement f−fo of the sample from the focal plane of a lens with numerical aperture NA=0.3 and focal distance $f_O$=26 mm.

The comparison results are shown in FIG. 3A, the distance between the centers of the slits at which the visibility of their image reaches 10% is represented as a function of the distance $f-f_O$ from the focal plane, for an objective O from a microscope with NA=0.3 and $f_O=26$ mm. We can see that the present invention (CPI) allows refocusing in a wider range than either standard imaging (SI) or standard plenoptic imaging (PI) with $N_u=3$, without loss of resolution of the image in focus typical of the latter.

Figure 3B:
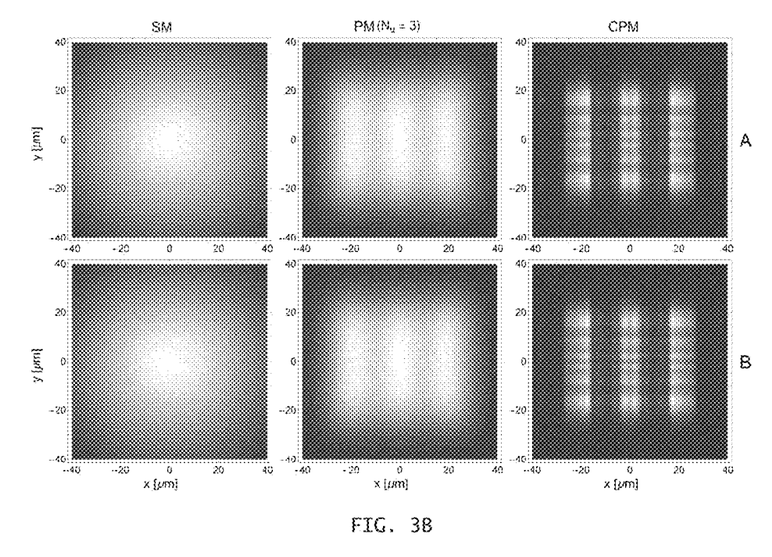
FIG. 3B shows simulated images of a triple luminous slit, obtained with SI, PI and CPI, corresponding to points A and B in the graph in FIG. 3A.

In FIG. 3B, two cases are shown in which the plenoptic microscope with correlation is capable of fully solving a triple luminous slit, while the standard image is completely blurred and the standard plenoptic image has a visibility just under 10%. All graphs refer to the case of Setup III, the other setups lead to similar results.

In conclusion, it can be said that the three proposed schemes are essentially analogous, and differ only in the positioning of some optical components and, consequently, for the refocusing algorithm. It is expected that Setup III may be favored for the greater practicality of assembly and use compared to the first two.

Figure 4:
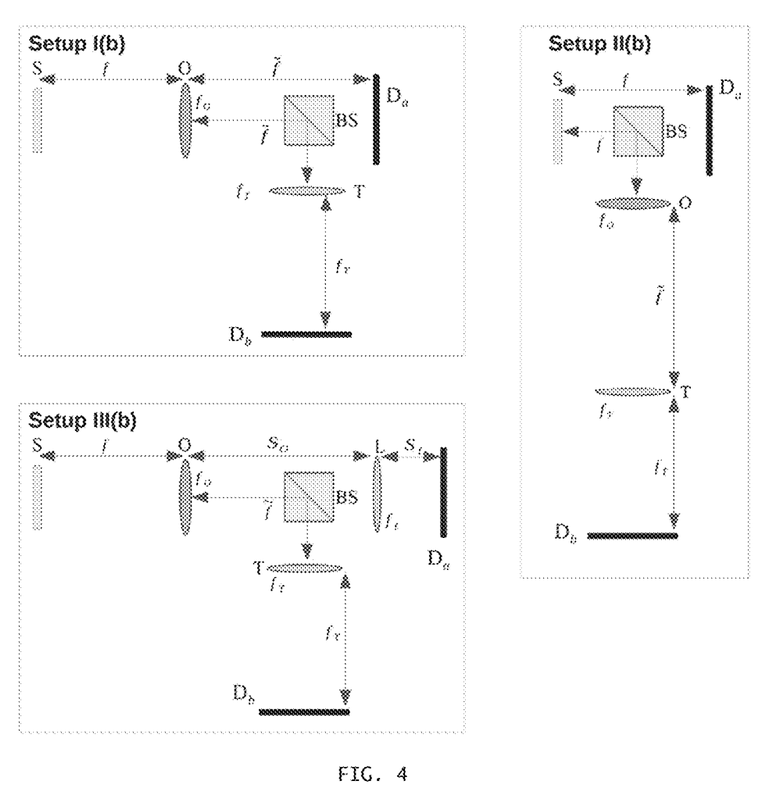
FIG. 4 schematically shows three further constructive configurations according to the present invention, which are alternative to those shown in FIG. 2, and which work in the same way as the latter.

Finally, it is worth noting that the same inventive concept described thus far regarding the three setups I, II and III shown in FIG. 2 can be applied without modification, with the same advantages and with the same modalities, also exchanging the positions of the lenses, sensors and devices arranged along the transmitted beam and the reflected beam, as shown in FIG. 4, in which the three setups I(b), II(b) and III(b) are shown, corresponding to setups I, II and III described above, respectively. This implies that the role of sensors $D_a$ and $D_b$, as spatial and angular detectors, is reversed.

The only precaution to be observed in applying the formulas mentioned in the present description with reference to FIG. 2, to the setups of FIG. 4, is to invert $\rho_a$ with $\rho_b$, and vice versa.

REFERENCES

[1] G. Scarcelli, V. Berardi, and Y. H. Shih, Phys. Rev. Lett. 96, 063602 (2006).
[2] M. D'Angelo, F. V. Pepe, A. Garuccio, and G. Scarcelli, Phys. Rev. Lett 116, 223602 (2016).
[3] F. V. Pepe, O. Vaccarelli, A. Garuccio, G. Scarcelli, and M. D'Angelo, J. Opt. 19, 114001 (2017).
[4] M. Levoy, R. Ng, A. Adams, M. Footer, and M. Horowitz, ACM Trans. Graph. 25, 924 (2006).
[5] T. G. Georgiev, A. Lumsdaine, A, Journal of Electronic Imaging 19, 021106 (2010).

The invention claimed is:

1. A system for capturing microscopic plenoptic images with turbulence attenuation by means of a microscope, the system comprising, in combination:
   a sample (S), an image of which should be obtained, which is treatable as a source of chaotic light, an emission of which has an intensity profile $F(\rho_s)$, with $\rho_s$ planar coordinate on the sample plane;
   a beam splitter (BS);
   two sensors or detectors ($D_a$ and $D_b$), configured to perform a spatial/directional and directional/spatial detection, respectively, where a planar coordinate on detector planes is indicated by $\rho_a$ and $\rho_b$, respectively;
   an objective lens (O), having focal length $f_O$ and pupil function $P_O (\rho_O)$, with $\rho_O$ planar coordinate on the lens plane;
   a second lens (T), having focal length $f_T$ and pupil function $P_T(\rho_T)$, with $\rho_T$ planar coordinate on the lens plane;
   wherein said second lens (T) is arranged in optical path (a/b) of a beam transmitted/reflected by the beam splitter (BS).

2. The system according to claim 1, further comprising a third lens (L), with focal length $f_L$, arranged in an optical path (b/a) of a beam reflected/transmitted by the beam splitter (BS).

3. The system according to claim 1, further comprising a frequency filter to reduce a bandwidth of the light emitted by the sample, in order to match a coherence time thereof with a response time of the detector.

4. The system according to claim 1, further comprising additional lenses and mirrors for shaping the optical path, in order to use a single sensor divided into two parts as a sensor ($D_a$ and $D_b$).

5. The system according to claim 1, further comprising polarizing and intensity filters for absorbing part of the light in one or both of the optical paths, in order to prevent saturation of the sensors and facilitate balancing of a signal thereon.

6. The system according to claim 1, wherein said two sensors ($D_a$ and $D_b$) consist of different parts of the same sensor.

7. The system according to claim 1, wherein, if the light intensity profile does not depend on polarization, said beam splitter (BS) is a polarizing beam splitter.

8. The system according to claim 1, wherein the optical path (a) from the sample to the detector ($D_a$) is the same as an ordinary light path in a common microscope: in the case of focus, the sample and the detector ($D_a$) are at a distance ($f_O$) from the objective lens and ($f_T$) from the second lens, respectively.

9. The system according to claim 1, wherein positioning of the sample (S) before the beam splitter (BS) makes turbulence effects in a vicinity of the sample (S) negligible, unlike other plenoptic imaging devices with correlation measurement, where the sample (S) is placed after the beam splitter (BS), in an arm (b) of the beam transmitted or in an arm (a) of the beam reflected by the same beam splitter.

10. The system according to claim 9, wherein the effects of the turbulence present at a longitudinal distance ($d_t$) from the sample are negligible, when a transverse dimension ($\delta_t$) within which phase variations due to the turbulence are practically constant, it satisfies the formula:

$$\delta_t \gtrsim \frac{d_t}{k\delta}, \qquad (3)$$

with $k=2\pi/\lambda$ light wave number and $\delta$ size of the smallest sample detail.

11. The system according to claim 1, wherein said beam splitter (BS) is placed between the objective lens (O) and the second lens (T), and wherein it is configured so that the beam transmitted/reflected by the beam splitter (BS) proceeds towards the second lens (T) to be focused on the sensor of the transmitted/reflected beam ($D_a/D_b$), while a beam reflected/transmitted by the beam splitter (BS) reaches the sensor of the reflected/transmitted beam ($D_b/D_a$), which is placed at a same distance as the second lens (T) with respect to the beam splitter (BS); thus obtaining that the optical paths from the sample (S) to the second lens (T), and from the sample (S) to the sensor of the reflected/transmitted beam ($D_b/D_a$) are practically identical so that, when measuring second-order correlations, a focused ghost image of the second lens (T) is formed at the sensor of the reflected/transmitted beam ($D_b/D_a$) while the image in focus or out of focus of the sample is formed at the sensor of the transmitted/reflected beam ($D_a/D_b$); the out-of-focus images of the sample (S) being thus capable of being reconstructed by combining the information on the image of the second lens (T) and the image of an object plane of the microscope.

12. The system according to claim 1, wherein said beam splitter (BS) is placed between the sample (S) and the objective lens (O), and wherein it is configured so that the beam transmitted/reflected by the beam splitter (BS) proceeds towards the second lens (T) to be focused on the sensor of the transmitted/reflected beam ($D_a/D_b$), while a beam reflected/transmitted by the beam splitter (BS) reaches the sensor of the reflected/transmitted beam ($D_b/D_a$) which is positioned at a same distance from the beam splitter (BS) with respect to the objective lens (O); thus obtaining that, when measuring the second-order correlations between intensities measured by the sensors of the transmitted/reflected beam ($D_a/D_b$) and of the reflected/transmitted beam ($D_b/D_a$), a focused ghost image of the lens will be focused at the sensor of the reflected/transmitted beam ($D_b/D_a$), so that out-of-focus images of the sample can be reconstructed by combining the information on the image of the objective lens (O) and the image of an object plane of the microscope.

13. The system according to claim 2, wherein said beam splitter (BS) is placed between the objective lens (O) and the second lens (T) and wherein a distance ($S_O$)—between the objective lens and the third lens (L)—and a distance ($S_I$)—between the third lens (L) and the sensor of the reflected beam ($D_b$)—both satisfy the relation $1/S_I + 1/S_O = 1/f_L$, so that the image of the objective lens (O) is not a ghost image, but an ordinary image formed by the third thin lens (L) on the sensor of the reflected/transmitted beam ($D_b/D_a$), thus obtaining the possibility for controlling the focusing of the objective lens on said sensor ($D_b$) in real time, without the need for a fine adjustment of the distance between the beam splitter (BS) and the objective lens (O) along the transmitted/reflected beam (a/b) with respect to the distance between the beam splitter (BS) and the sensor ($D_b$), along the reflected/transmitted beam (b/a).

14. A method for capturing microscopic plenoptic images with turbulence attenuation, by means of the system according to claim 1, wherein the plenoptic image, which also contains information on the light direction, is obtained by analyzing intensity correlations between pixels of the two sensors of the transmitted beam ($D_a$) and of the reflected beam ($D_b$).

15. The method according to claim 14, wherein the information on the image is contained in a correlation between intensity fluctuations $\Gamma(\rho_a, \rho_b) = \langle \Delta I_a(\rho_a) \Delta I_b(\beta_b) \rangle$,  (1)

where:

⟨ ... ⟩ denotes an average on statistics of the light emitted by the sample, $I_{a,b}(\rho_{a,b})$ are intensities in the positions $\rho_a$ and $\rho_b$ on each sensor, and $\Delta I_{a,b} = I_{a,b} - \langle I_{a,b} \rangle$ are intensity fluctuations with respect to their average value $\langle I_{a,b} \rangle$.

16. The method according to claim 15, wherein the statistical average is replaced by a time average over N consecutive frames of duration τ, captured in a time window of duration T.

17. The method according to claim 16, wherein, assuming that the light emitted has negligible traverse coherence, the correlation between the intensity fluctuations has a value, apart from irrelevant constant factors, $\Gamma(\rho_a, \rho_b) = |\int d^2\rho_s g_a(\rho_a, \rho_s) g_b(\rho_b, \rho_s)^* \mathcal{F}(\rho_s)|^2$,  (2)

where $g_a$ and $g_b$ are optical transfer functions in the path of the transmitted beam (a) and of the reflected beam (b), respectively.

18. The method according to claim 14, further comprising the use of a system for capturing microscopic plenoptic images according to claim 11, and wherein in order to obtain a refocused image of the sample (S) from knowledge of a correlation function between intensity fluctuations, it includes the use of refocusing algorithms as specified in the following formulas:

$$\Gamma_{ref}(\rho_a, \rho_b) = \Gamma\left[\frac{F}{\tilde{f}}\frac{fo}{f}\rho_a + \frac{f_T}{\tilde{f}}\left(1 - \frac{F}{\tilde{f}}\right)\rho_b, \rho_b\right] \sim |P_T(\rho_b)|^2 \left|\mathcal{F}\left(-\frac{\rho_a}{M}\right)\right|^2 \quad (9)$$

and $$\sum_{ref}(\rho_a) = \int d^2\rho_b \Gamma_{ref}(\rho_a, \rho_b) \sim \left|\mathcal{F}\left(-\frac{\rho_a}{M}\right)\right|^2. \quad (10)$$

19. The method according to claim 14, further comprising the use of a system for capturing microscopic plenoptic images according to claim 12, and wherein in order to obtain a refocused image of the sample (S) from knowledge of a correlation function between intensity fluctuations, it includes the use of refocusing algorithms as specified in the following formulas:

$$\Gamma_{ref}(\rho_a, \rho_b) = \Gamma\left[\frac{fo}{f}\rho_a - \left(1 - \frac{fo}{f}\right)M\rho_b, \rho_b\right] \sim |P_O(\rho_b)|^2 \left|\mathcal{F}\left(-\frac{\rho_a}{M}\right)\right|^2 \quad (15)$$

and $$\sum_{ref}(\rho_a) = \int d^2\rho_b \Gamma_{ref}(\rho_a, \rho_b) \sim \left|\mathcal{F}\left(-\frac{\rho_a}{M}\right)\right|^2. \quad (16)$$

20. The method according to claim 14, further comprising the use of a system for capturing microscopic plenoptic images according to claim 13, and wherein in order to obtain a refocused image of the sample (S) from knowledge of a correlation function between intensity fluctuations, it includes the use of refocusing algorithms as specified in the following formulas:

$$\Gamma_{ref}(\rho_a, \rho_b) = \quad (19)$$
$$\Gamma\left[\frac{fo}{f}\rho_a + \left(1 - \frac{fo}{f}\right)\frac{M}{M_L}\rho_b, \rho_b\right] \sim \left|P_O\left(-\frac{\rho_b}{M_L}\right)(\rho_b)\right|^4 \left|\mathcal{F}\left(-\frac{\rho_a}{M}\right)\right|^2$$

and $$\sum_{ref}(\rho_a) = \int d^2\rho_b \Gamma_{ref}(\rho_a, \rho_b) \sim \left|\mathcal{F}\left(-\frac{\rho_a}{M}\right)\right|^2. \quad (20)$$

* * * * *